United States Patent [19]

Takanohashi et al.

[11] 4,387,410
[45] Jun. 7, 1983

[54] MAGNETIC ERASE HEAD FOR A TAPE PLAYER

[75] Inventors: Kenji Takanohashi; Jiro Asahina, both of Yokohama, Japan

[73] Assignee: Victor Company of Japan, Limited, Yokohama, Japan

[21] Appl. No.: 146,112

[22] Filed: May 2, 1980

Related U.S. Application Data

[63] Continuation-in-part of Ser. No. 24,876, Mar. 28, 1979, Pat. No. 4,264,938.

[30] Foreign Application Priority Data

May 4, 1979 [JP] Japan .................. 54-53974

[51] Int. Cl.³ ............................................. G11B 5/12
[52] U.S. Cl. ................................. 360/118; 360/119; 360/122; 360/125; 360/130.21
[58] Field of Search .............. 360/118, 119, 120, 121, 360/122, 125, 130.21

[56] References Cited

U.S. PATENT DOCUMENTS

| | | | |
|---|---|---|---|
| 2,784,259 | 3/1957 | Camras | 360/118 |
| 2,950,355 | 8/1960 | Moehring | 360/118 |
| 3,812,536 | 5/1974 | Linke | 360/118 |
| 3,882,544 | 5/1975 | Hughes | 360/118 |
| 3,949,422 | 4/1976 | Sato | 360/118 |
| 4,264,938 | 4/1981 | Takanohashi | 360/118 |
| 4,264,939 | 4/1981 | Takii | 360/118 |

FOREIGN PATENT DOCUMENTS

| | | | |
|---|---|---|---|
| 54-130010 | 10/1979 | Japan | 360/118 |
| 534786 | 4/1975 | U.S.S.R. | 360/118 |

*Primary Examiner*—Alan Faber
*Attorney, Agent, or Firm*—Lowe, King, Price & Becker

[57] ABSTRACT

A magnetic erase head for a tape player comprises a head tip portion and a back core portion. The head tip portion consists of a W-shaped tip, which is constructed of a center tip and a pair of side tips connected via spacers to the center tip, and a dummy tip, which is constructed of a tip member and a separator received in a recess made in the tip member. The back core portion consists of a center core equipped with a winding, and an L-shaped core connected to the center core at its rear portion. A recess in the front portion of the L-shaped core receives the front portion of the center core. The L-shaped core has two tapered arms defining the recess. Nonmagnetic blocks may be provided for reinforcing the arms. The dummy tip may be made of a nonmagnetic material if desired. With this arrangement a magnetic erase head having a narrow tip and a high erasure ratio is provided.

20 Claims, 5 Drawing Figures

MAGNETIC ERASE HEAD FOR A TAPE PLAYER

The present application is a continuation-in-part of Ser. No. 024,876, filed Mar. 28, 1979, now U.S. Pat. No. 4,264,938, dated Apr. 28, 1981.

FIELD OF THE INVENTION

This invention relates generally to a magnetic head for a magnetic recording and/or reproducing device, such as a tape recorder. More particularly, the present invention relates to an improvement in the size of a magnetic head, such as an erase head, suitable for a cassette tape player.

BACKGROUND OF THE INVENTION

The production techniques of magnetic recording medium, such as a magnetic tape, have been recently improved remarkably so that a new magnetic tape, such as a metallic tape, having an extremely high coercive force, for instance Hc=1,200 Oe, has appeared in the market. In order to erase signals prerecorded on such a magnetic tape, the erasure ratio, i.e. the degree of erasure, must be over −60 dB. To meet this requirement the size of conventional erase heads had to be increased, providing an erasure ratio sufficient to erase signals prerecorded on such a new type magnetic tape. However, when an erase head is assembled in a cassette tape recorder or a player, the size of the erase head must be small enough since there is little space left for an erase head due to the provision of other elements, such as a recording head, a reproducing head, a capstan idler and the like. For instance, in a three-head cassette tape player, the space left for an erase head is about 2.6 millimeters when measured in the direction of the tape movement. The width of an erase head having conventional construction, and providing sufficient erasure ratio for the above mentioned new tapes can not be made to fit this space less than this value.

SUMMARY OF THE INVENTION

The present invention has been developed in order to overcome the above described contradiction inherent to the conventional erase heads.

It is, therefore, a primary object of the present invention to provide a new and useful erase head having both a small size and an erasure ratio characteristic of over −60 dB.

Another object of the present invention is to provide such an erase head, having a tip width equal to or less than 2.6 millimeters.

A further object of the present invention is to provide such an erase head of a composite type which admits of high saturation magnetic flux in the vicinity of junctions between a head tip portion and a back core portion.

A still further object of the present invention is to provide such an erase head in which the tip portion and the back core portion comprise particular members of specific shapes so as to provide a large function area between them.

In accordance with the present invention there is provided a magnetic erase head comprising (a) a head tip portion including a center tip and a pair of side tips respectively connected via spacers to the both sides of the center tip, each of the center tip and the pair of side tips having front and rear ends, the front end portion of the head tip portion being exposed to be in contact with a magnetic recording medium; and (b) a back core portion including a center core equipped with a winding, and an L-shaped core, each of the center core and the L-shaped core having front and rear ends, the front end of the center core being connected to the rear end of the center tip while the rear end of the center core is connected to the rear end of the L-shaped core, the front end of the L-shaped core having a substantially U-shaped recess for receiving the front end portion of the center core without coming into contact therewith, the front end of the L-shaped core being connected to the rear end of the side tips.

BRIEF DESCRIPTION OF THE DRAWINGS

These and other objects and features of the present invention will become more readily apparent from the following detailed description of the preferred embodiments taken in conjunction with the accompanying drawings in which.

DETAILED DESCRIPTION OF THE PREFERRED EMBODIMENTS

Figure 1:
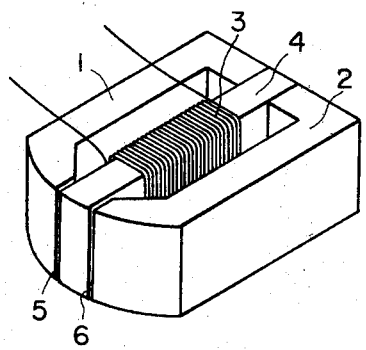
FIG. 1 is a perspective view of a typical conventional erase head for a tape player.

Conventional erase heads are discussed for a better understanding of the objects of the present invention prior to describing the preferred embodiments of the present invention. Customary magnetic tapes other than the aforementioned new tapes have a magnetic coercive force of approximately 300 Oe if the magnetic substance of the tape is ferrite, or approximately 500 Oe if the magnetic substance is $CrO_2$. In FIG. 1 is shown an example of a conventional erase head suitable for erasing signals prerecorded on a regular conventional magnetic tape.

The erase head of FIG. 1 comprises a pair of side cores 1 and 2 both made of ferrite which has high resistance to wear and a superior high-frequency characteristic, a center core 4 having a winding 3 thereon, and nonmagnetic spacers 5 and 6. The side cores 1 and 2 and the center core 4 are integrally assembled via the spacers 5 and 6 which provide magnetic gaps therebetween. When this erase head shown in FIG. 1 is used to erase signals prerecorded on the above-mentioned regular conventional magnetic tape, an erasure ratio of approximately −60 dB is easily obtained. However, when this erase head is used to erase signals prerecorded on the aforementioned new tape, such as a metallic tape, it has been found that the erase head is not practicable at all for the following reason. Namely, if the coercive force of a magnetic tape is high, such as the order of 1,200 Oe, the magnetic fluxes in the vicinity of the head gap are apt to be saturated when ferrite, the saturation magnetic flux Bs of which is approximately 4,000 gausses, is used for the cores 1, 2 and 4 inasmuch as the cross-sectional area of each of the cores 1, 2 and 4 close to the gaps is so small that it provides narrow magnetic paths. Therefore, even though the electric current applied to the winding 3 is increased for the purpose of raising the erasure ratio, it is impossible to erase the signals prerecorded on such a metallic magnetic tape to an extent that is practicable for the next recording.

In order to overcome the above described disadvantage a new erase head of a composite type has been recently developed. The new type erase head comprises a head tip which is used as a core member in the vicinity of the head gaps, and a back core connected to the head tip. The head tip is made of Sendust, that is an alloy of Fe, Si and Al, which has a high saturation magnetic flux, for instance 10,000 gausses, and a high resistance to wear, while the back core is made of ferrite since the cross-sectional area of the magnetic paths in the back core may be made large enough.

Figure 2:
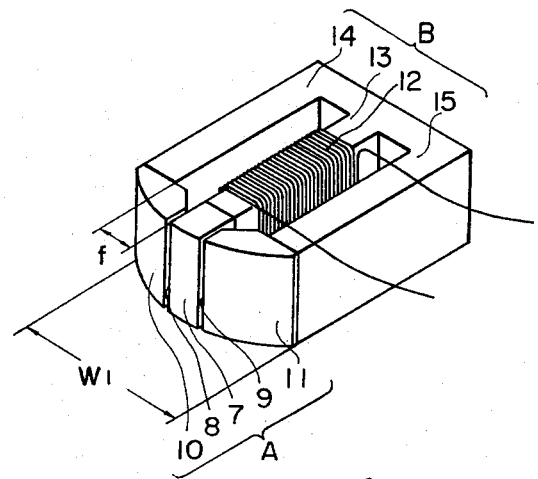
FIG. 2 is a perspective view of a typical conventional composite type erase head.

In FIG. 2 is shown the above-mentioned composite type erase head comprising a head tip A and a back core B which are fixedly bound by suitable adhesive. The head tip A includes a center tip 7 which is made of Sendust, and a pair of side tips 10 and 11 which are also made of Sendust and are integrally formed via nonmagnetic spacers 8 and 9. The back core B includes a center core 13 around which a winding 12 is provided, and a pair of side cores 14 and 15 so that the back core B has an E-shape. When such a composite type erase head is used to erase signals prerecorded on a magnetic tape the coercive force of which is such as 1,200 Oe, it is possible to obtain an erasure ratio over −60 dB throughout the entire audio range.

However, when it is intended to provide a suitable erase head for a cassette tape player, i.e. the tip width of the erase head has to be within a given length, without deteriorating the erasure ratio and the erasure efficiency, the following difficulties arise. Namely, the following three points have to be considered when designing an erase head having a superior erasing characteristic:

(1) It is necessary to reduce the magnetic reluctance by increasing the areas of the junctions between respective core members, and to relieve the magnetic saturation by increasing the cross-sectional area of each of the magnetic paths.

(2) Although it is desirable to reduce the length of the magnetic paths as much as possible, the occurrence of a magnetic short circuit, which may occur when the leakage fluxes from the winding 12 directly flow to the side cores 14 and 15, must be prevented by having a predetermined distance between the center core 13 and each of the said cores 14 and 15 in such an E-shaped back core structure.

(3) It is necessary to adopt a polishing method and to select adhesive so that the contact spaces between the cores, when assembled, are very small.

The first and second points in the above listed three points mean that the width $W_1$ of the head tip A has to be set wide enough. From the foregoing, it is quite impossible to reduce the width $W_1$ of the head tip A while the erasure ratio is maintained at the before mentioned practicable level.

An improvement in an erase head according to the present invention is described in detail infra referring to an erase head suitable for a cassette tape player of either a four-track, two channel type or a two-track monaural type.

Figure 3:
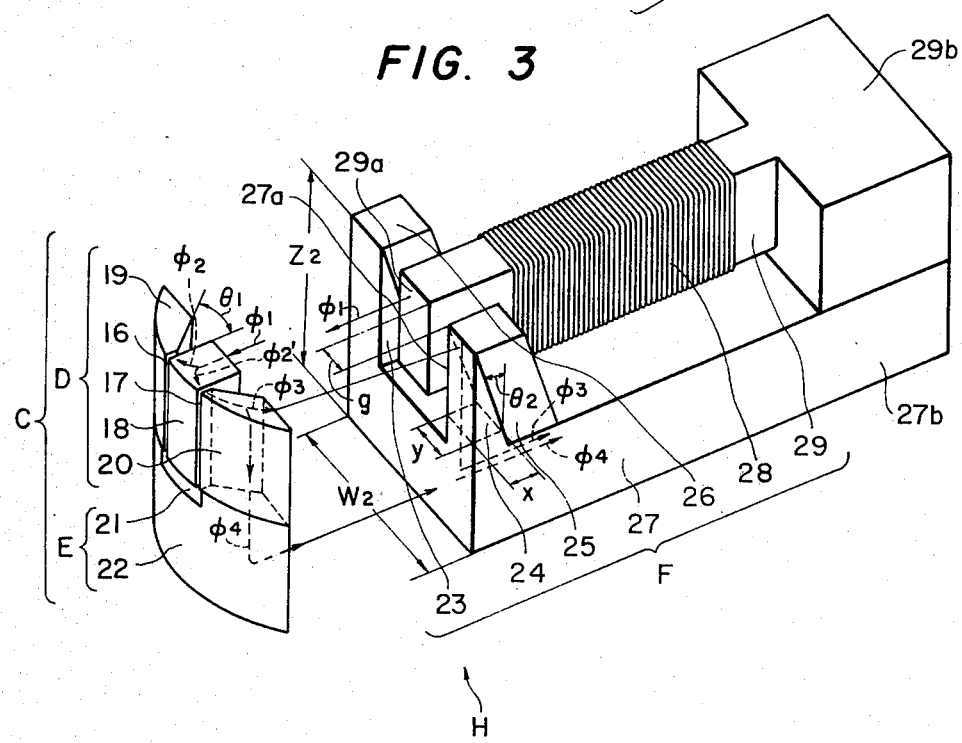
FIG. 3 is an exploded perspective view of a first embodiment of a composite type erase head according to the present invention.
Figure 4:
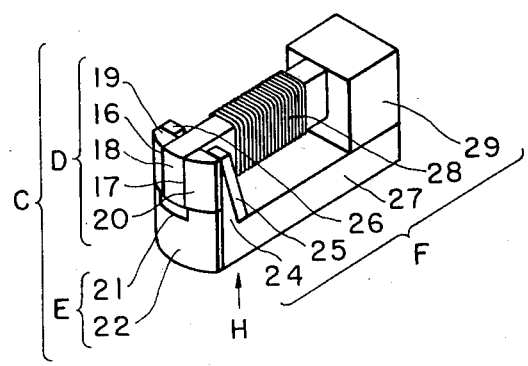
FIG. 4 is a perspective view of the assembled erase head of FIG. 3.

In FIG. 3 and FIG. 4 is shown a first embodiment of the composite type erase head H according to this invention. In FIG. 3, the erase head is shown by way of an exploded view, while the same erase head is shown in FIG. 4 as being assembled. The erase head basically comprises a head tip portion C and a back core portion F. Although no casing is shown, the erase head of FIG. 4 is covered by a suitable casing when the head is installed in a recording and/or reproducing device.

The head tip portion C includes a W-shaped tip D and a dummy tip E; and this W-shaped tip D comprises a center tip 18, a pair of side tips 19 and 20, and a pair of spacers 16 and 17. The center tip 18 and the pair of side tips 19 and 20 are made of Sendust, while the spacers 16 are made of nonmagnetic material. Each of the center tip 18 and the side tips 19 and 20 has front and rear faces, and the side tips 19 and 20 are respectively fixed via the spacers 16 and 17 to the both sides of the center tip 18. At least the front of each of the side tips 19 and 20 is convexly curved so that the front of the W-shaped tip D is able against abut to a magnetic recording tape without undesirable friction. The rear surfaces of the center tip 18 and the side tips 19 and 20 are flat and flush with each other. Each of the side tips 19 and 20 is formed by cutting off a rear corner thereof which would otherwise abut against the side of the center tip 18. The side tips 19 and 20 illustrated in FIG. 3 and FIG. 4 are in a condition such that the corners thereof have been already cutoff along a line which has an angle $\theta_1$ with respect to the side surface of the center tip 18. Although this angle $\theta_1$ is shown in the drawing as being to only the left side tip 19, the right side tip 20 is processed in the same manner. Because of the cutoff, the thickness of each of the side tips 19 and 20 close to the gaps is made extremely thin so that magnetic flux is concentrated in each of the gaps, while preventing leakage flux between the sides of the center tip 18 and the side tips 19 and 20 through other than the gaps. This thickness, which corresponds to the thickness of the gaps, defined by the convexly curved front and the cutoff angle $\theta_1$, determines the life of the head tip portion C.

The dummy tip E comprises a tip member 22 made of a magnetic material and a separator 21. The front of the tip member 22 is convexly curved in the same manner as the W-shaped tip D so that the front of the dummy tip E is flush with the front of the W-shaped tip D when the head tip portion C is assembled by connecting the top of the dummy tip E to the bottom of the W-shaped tip D. A substantially U-shaped recess (no numeral) is formed at the top center of the dummy tip E for receiving the separator 21 which is made of a nonmagnetic material. Namely, the separator 21 disposed between the bottom of the center tip 18 and the top center of the dummy tip E prevents magnetic coupling between tips 18 and E. The dummy tip E also has a flat rear surface which is flush with the rear surface of the W-shaped tip D. All of the rear surfaces of the members included in the head tip portion C are made very smooth so they can adhere closely to appropriate portions in the back core portion F.

The back core portion F comprises an L-shaped core 27, a T-shaped center core 29, both made of a magnetic material, such as ferrite, and reinforcing blocks 25 and 26 both made of a nonmagnetic material. A winding 28 is provided around the center core 29, and a rear portion 29b of the center core 29 is connected to a rear portion 27b of the L-shaped core 27. The thickness of the rear portion 29b of the center core 29 is greater than the remaining portion of the center core 29 so that the winding 28 wound around the center core 29 is spaced from the L-shaped core 27. The center core 29 has a front end 29a which is received in a U-shaped recess 27a in the front portion of the L-shaped core 27. In other words, the front portion 29a of the center core 29 is interposed between two arms 23 and 24 which are parts of the above-mentioned L-shaped core 27. However, the only portion of center core 29 in contact with the L-shaped core 27, is the rear portion 29b thereof. Thus, the front portion 29a of the center core 29 is spaced from the inner wall of each of the arms 23 and 24 by a given distance expressed by g. The front surface 29a of the center core 29 and the front surface of the L-shaped core 27 are flat and flush with each other so as to be able to be connected to the rear portion of the aforementioned head tip portion C. The head tip portion C and the back core F are fixedly coupled with each other by means of suitable adhesive.

The arms 23 and 24 are respectively tapered in such a manner that the cross-sectional area of each of the arms 23 and 24 becomes slenderer toward the tip portion thereof. The reinforcing blocks 25 and 26 are respectively provided to reinforce the arms 23 and 24. These blocks 25 and 26 are oblique-prism shaped to be attached to the rear portion of each of the arms 23 and 24 and the body of the L-shaped core 27. However, these reinforcing blocks 25 and 26 may be omitted if unnecessary.

The notable difference in construction between the conventional composite type erase head of FIG. 2 and the composite type erase head of FIG. 3 according to the present invention is that the magnetic path which constitutes a magnetic circuit spreads in the transverse direction ($W_1$), which corresponds to the direction of the tape movement, in the prior art technique of FIG. 2; the magnetic path in accordance with the present invention spreads vertically, i.e. in the direction of the height $Z_2$ of the head at right angles to the tape movement direction, as shown in FIG. 3. Although it is necessary to have a relatively wide space f between the center core 13 and each of the side cores 14 and 15 in the prior art to prevent leakage flux from the center core 13 from getting into the side cores 14 and 15, and to provide a given space for the winding 12, such a space f is unnecessary in the construction of the erase head according to the present invention. Namely, according to the present invention there are no side cores which constitute magnetic paths, and a magnetic path is constructed of a core member, i.e. the L-shaped core 27, which is disposed below the center core 29. If desired, however, the L-shaped core 27 may be arranged above the center core 29. Since the magnetic path according to the present invention spreads vertically, the reduction of head width $W_2$ is easily attained, and thus the width $W_1$ in the prior art can be considerably reduced to the width $W_2$ without deteriorating the erasure ratio characteristics.

The flow of the magnetic flux in the erase head according to the present invention is as follows: A magnetic flux $\phi_1$ induced in the center core 29 when the winding 28 is energized enters center tip 18 and is divided into two paths containing fluxes $\phi_2$ and $\phi_2'$. These two fluxes $\phi_2$ and $\phi_2'$ respectively go toward the side tips 19 and 20 through the spacers 16 and 17 so that magnetic fields are formed at the gaps for erasing signals prerecorded on a magnetic recording tape. Since the two magnetic fluxes $\phi_2$ and $\phi_2'$ flow in the same manner to return to the center core 29, the movement of only one flux $\phi_2'$ is discussed infra. The flux $\phi_2'$ entering side tip 20 is divided into two fluxes $\phi_3$ and $\phi_4$. Flux $\phi_3$ enters arm 24 of the L-shaped core 27, while $\phi_4$ enters dummy tip E, thence L-shaped core 27. Thereby, fluxes $\phi_3$ and $\phi_4$ pass through the L-shaped core 27 and then reach center core 29 via the rear portion 27b of the L-shaped core 27 and the rear portion 29b of the center core 29. Consequently, the magnetic flux $\phi_1$ emitted from the front end 29a of the center core 29 circulates in a closed magnetic loop to reach the rear portion 29b of the center core 29.

The magnitude of the magnetic fluxes $\phi_3$ and $\phi_4$ is inversely proportional to the reluctance of the corresponding magnetic path. The flux magnitude cannot be increased over a given value due to magnetic saturation, which occurs when the amount of flux flowing through a magnetic path is relatively great. The reluctance R of magnetic flux path is generally expressed by the following Eq. (1):

$$R = l/\mu S \quad (1)$$

wherein
l is the length of a magnetic path;
$\mu$ is the permeability of the magnetic path; and
S is the cross-sectional area of the magnetic path:
Furthermore, the maximum flux $\phi_m$ which can flow through the magnetic path is given by:

$$\phi_m = Bs \times S \quad (2)$$

where
Bs is the maximum flux density of the magnetic substance:

In designing an erase head, it is determined which flux $\phi_3$ or $\phi_4$ should be mainly used depending on the characteristics of the magnetic substance used and the shape of the head. For instance, when it is intended to produce an erase head having an extremely narrow width, the width y of each of the arms 23 and 24 of the L-shaped core 27 has to be reduced. In this case, the contact area between the side tips 19 and 20 and the arms 23 and 24 is reduced accordingly so that the reluctance increases. As a result, the flux $\phi_3$ is mainly used rather than the flux $\phi_4$. An extreme example of this case is when arms 23 and 24 are removed.

As another example, when a magnetic substance having a relatively large eddy-current loss at high frequencies is used as the head tip portion C, it is not desirable for a great amount of magnetic flux to flow through the magnetic path for flux $\phi_4$ due to the problem of heat generation. In this case it is advantageous to use the magnetic path through which the flux $100_3$ flows. Furthermore, when it is desired not to use the magenetic path through which the flux $100_4$ flows, the dummy tip E may be made of a nonmagnetic material having high resistance to wear so as to block the magnetic path of the flux $100_4$. In addition, the contact area between the arms 23 and 24 and the side cores 19 and 20 may be increased for reducing the reluctance.

When it is intended to increase the contact area as mentioned in the above, it is necessary to increase either the width y or the depth x of the arms 23 and 24 so as to avoid magnetic saturation. The width y of each of the arms 23 and 24 cannot be excessively increased since such an increase might result in a decrease in the distance g between the arm 23 or 24 and the center core 29 if the maximum width $W_2$ of the head is determined. Accordingly, the depth x of each of the arms 23 and 24 has to be increased to this end. However, if the arms 23 and 24 were not tapered as described supra, i.e. if the arms 23 and 24 were respectively rectangular prisms, the area which faces the center core 29 is not negligible since the increase in the facing area results in a decrease in reluctance, and therefore, the leakage flux between the arm 24 and the center core 29 (also between the arm 23 and the center core 29) increases, to decrease the erasure efficiency of the erase head.

The tapered structure of the arms 23 and 24 is employed as a countermeasure against this undesirable phenomenon. Namely, because each of the arms 24 and 25 is tapered at an angle $\theta_2$ as illustrated, the facing area can be reduced to half of the area for the case in which arms 24 and 25 are not tapered. The value of $\theta_2$ is readily obtained from the Equations (1) and (2) and the like so that no magnetic saturation would occur in any portion in the arms 24 and 25.

Figure 5:
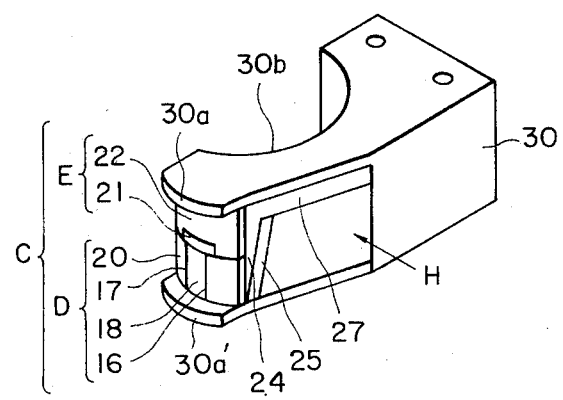
FIG. 5 is a perspective view of a second embodiment of a composite type erase head according to the present invention.

Reference is now made to FIG. 5 in which there is shown a perspective view of a second embodiment of the erase head according to the present invention. The same elements as those shown in FIG. 4 are designated by the like numerals. The erase head shown in FIG. 5 is designed to be incorporated in a three-head cassette tape player. The erase head assembly has a semicircular or curved recess 30b in which the pinch roller (capastan idler) is received. Since the space for mounting the heads in a cassette tape player is limited, it is advantageous for the erase head to have such a recess for effectively using the limited space. The erase head of the second embodiment has first and second tape guides 30a and 30a' which are integrally formed with a core holder 30. Each of the tape guides 30a and 30a' has a curved recess with the same shaped along one side thereof. Since each of the tape guides 30a and 30a' covers the body of the erase head H, the shape of the erase head per se is arranged to have the same shaped curved recess. In other words, the L-shaped core 27 and the center core 29 (not shown in FIG. 5, but shown in FIG. 4) are both curved to be parallel with the tape guides 30a and 30a' so that none of the portions thereof project in the curved recess defined by the tape guides 30a and 30a'.

From the foregoing it will be understood that the present invention provides an erase head having superior erasure characteristics since the flow paths of the magnetic fluxes $\phi_1$ and $\phi_2$ may be easily changed by slightly modifying the design of the erase head as to the shape and the width of the head tip portion C. The following data were obtained when an erase head according to the present invention having a tip width of 2.6 millimeters was used to erase signals prerecorded on a so called metallic tape having an Hc of 1,200 Oe:

ERASURE RATIO: OVER $-70$ dB (when an erasing current of 400 KHz is applied to the winding)
ERASURE EFFICIENCY: 75 mAT
DISTORTION FACTOR: WITHIN 2%
TEMPERATURE INCREASE: WITHIN 10° C.

In the above, the instant invention has been described in connection with an erase head. However, the basic idea of the present invention is not limited to an erase head. Namely, the idea may be adapted for record and reproduce heads so that high efficiency in recording and/or reproducing may result.

What is claimed is:

1. A magnetic erase head comprising:
   (a) a head tip portion including a center tip and a pair of side tips respectively located adjacent and spaced from the sides of said center tip, each of said center tip and said pair of side tips having front and rear ends, the front end portion of said head tip portion being exposed so in use it contacts a magnetic recording medium travelling in a direction from one side tip to the other, each of said center tip and said pair of side tips having a height corresponding to a given width of a track on said recording medium; and
   (b) a back core portion including a center core equipped with a winding, and an L-shaped core, each of said center core and said L-shaped core having front and rear ends, said front end of said center core being connected to said rear end of said center tip while said rear end of said center core is connected to said rear end of said L-shaped core, said front end of said L-shaped core having two arms defining a substantially U-shaped recess in which said front end portion of said center core is received without coming into contact therewith, said two arms of said L-shaped core being respectively connected to said rear ends of said side tips, the center lines of the L-shaped core and center core being spaced apart in a plane perpendicular to the direction of travel from one side tip to the other, and the two arms defining the U-shaped recess extending and tapering from the main part of the L-shaped core in a direction normal both to the center line of the L-shaped core and the direction from one side tip to the other so that the areas of the arms facing the center core decrease towards the free ends of the arms.

2. A magnetic erase head as claimed in claim 1, further comprising means for reinforcing said tapered arms.

3. A magnetic erase head as claimed in claim 2, wherein said reinforcing means is made of a nonmagnetic material.

4. A magnetic erase head as claimed in claim 1 said center core is T-shaped.

5. A magnetic erase head as claimed in claim 1, wherein the thickness of the rear portion of said center core, which portion is connected to said L-shaped core, is made greater than the remaining portion of said center core.

6. A magnetic erase head as claimed in claim 1, wherein the exposed portion of said head tip portion is convexly curved.

7. A magnetic erase head as claimed in claim 1, wherein the thickness of each of said side tips close to said center tip is made thinner than the remaining portion of said side tip.

8. A magnetic erase head as claimed in claim 1, wherein said head tip portion except for said spacers is made of Sendust.

9. A magnetic erase head as claimed in claim 1, further comprising a dummy tip fixedly connected to either the top or the bottom of said head tip portion.

10. A magnetic erase head as claimed in claim 9, wherein said dummy tip is made of a nonmagnetic material.

11. A magnetic erase head as claimed in claim 9, wherein said dummy tip is connected to said L-shaped core.

12. A magnetic erase head as claimed in claim 9, wherein the front of said dummy tip is made flush with the front of said head tip.

13. A magnetic erase head as claimed in claim 1, further comprising tape guide means.

14. A magnetic erase head as claimed in claim 13, further comprising a core holder integrally formed with said tape guide means.

15. A magnetic erase head as claimed in claim 14, wherein said core holder has a curved recess, while said center core and said L-shaped core are also curved to the curve of said core holder.

16. A magnetic erase head as claimed in claim 1, wherein said L-shaped core is disposed below said center core.

17. A magnetic erase head as claimed in claim 1, wherein said L-shaped core is disposed above said center core.

18. A magnetic erase head comprising:
(a) a head tip portion including a center tip and a pair of side tips respectively connected via spacers to both sides of said center tip, each of said center tip and said pair of side tips having front and rear ends, the front end portion of said head tip portion being exposed so it is adapted to contact a magnetic recording medium;
(b) a back core portion including a center core equipped with a winding, and an L-shaped core, each of said center core and said L-shaped core having front and rear ends, said front end of said center core being connected to said rear end of said center tip while said rear end of said center core is connected to said rear end of said L-shaped core, said front end of said L-shaped core having a substantially U-shaped recess for receiving said front end portion of said center core without contacting it, said front end of said L-shaped core being connected to said rear ends of said tips; and
(c) means for reinforcing said tapered arms, said means having an oblique prism shape.

19. A magnetic erase head comprising:
(a) a head tip portion including a center tip and a pair of side tips respectively connected via spacers to both sides of said center tip, each of center tip and said pair of side tips having front and rear ends, the front end portion of said head tip portion being exposed so it is adapted to contact a magnetic recording medium;
(b) a back core portion including a center core equipped with a winding, and an L-shaped core, each of said center core and said L-shaped core having front and rear ends, said front end of said center core being connected to said rear end of said center tip while said rear end of said center core is connected to said rear end of said L-shaped core, said front end of said L-shaped core having a substantially U-shaped recess for receiving said front end portion of said center core without coming into contact therewith, said front end of said L-shaped core being connected to said rear ends of said side tips; and
(c) a dummy tip fixedly connected to either the top or the bottom of said head tip portion, said dummy tip including a magnetic tip member having a recess for receiving a nonmagnetic separator.

20. A magnetic erase head as claimed in claim 19, wherein said separator is disposed in the vicinity of said center tip.

* * * * *